United States Patent [19]

Aoshima et al.

[11] Patent Number: 5,597,860

[45] Date of Patent: Jan. 28, 1997

[54] VULCANIZABLE RUBBER COMPOSITIONS AND VULCANIZED RUBBER

[75] Inventors: Masashi Aoshima; Hironobu Shigematsu; Takeru Wadaki, all of Ibaraki; Toshikatsu Kanehara, Ichinomiya; Kazuya Watanabe, Inazawa; Toshiyuki Tanaka, Aichi, all of Japan

[73] Assignees: Sumitomo Chemical Company Limited, Osaka; Toyoda Gosei Co., Ltd., Aichi-ken, both of Japan

[21] Appl. No.: 505,708

[22] Filed: Jul. 21, 1995

Related U.S. Application Data

[63] Continuation of Ser. No. 117,038, filed as PCT/JP93/00004 Jan. 8, 1992, abandoned.

[30] Foreign Application Priority Data

Jan. 8, 1992 [JP] Japan .................................. 4-001397

[51] Int. Cl.$^6$ ........................... C08L 53/02; C08L 23/26; C08F 255/04
[52] U.S. Cl. .................... 524/505; 525/89; 525/95; 525/97; 525/98; 525/211; 525/236; 525/237; 525/331.8; 525/332.6
[58] Field of Search ............................. 524/505; 525/89, 525/98, 97, 332.6, 331.8, 211, 95, 236, 237

[56] References Cited

U.S. PATENT DOCUMENTS

| | | | |
|---|---|---|---|
| 3,445,543 | 5/1969 | Gruver | 525/237 |
| 3,897,405 | 7/1975 | Son et al. | 525/331.8 |
| 4,137,350 | 1/1979 | Blaskiewicz et al. | 428/68 |
| 4,350,795 | 9/1982 | Bohm et al. | 525/98 |
| 4,778,852 | 10/1988 | Futamura | 524/505 |
| 4,956,413 | 9/1990 | Tanimoto et al. | 525/331.8 |
| 5,348,994 | 9/1994 | Gorbaty et al. | 524/68 |

FOREIGN PATENT DOCUMENTS

| | | |
|---|---|---|
| 387436 | 9/1990 | European Pat. Off. . |
| 2641518 | 3/1977 | Germany . |
| 48-29870 | 4/1978 | Japan . |
| 54-23958 | 8/1979 | Japan . |
| 60-163944 | 8/1985 | Japan . |
| 61-60739 | 3/1986 | Japan . |
| 1-139634 | 6/1989 | Japan . |

*Primary Examiner*—Paul R. Michl
*Assistant Examiner*—Olga Asinovsky
*Attorney, Agent, or Firm*—Watson Cole Stevens Davis P.L.L.C.

[57] ABSTRACT

The present invention provides a vulcanizable rubber composition comprising 100 parts by weight of a polymer component consisting of 30 to 80 wt. % of an ethylene•α-olefin•non-conjugated diene copolymer having a Mooney viscosity of 10 to 100 ($ML_{1+4}$ 100° C.) and an iodine value of 20 to 45 and containing ethylene and α-olefin in a weight ratio of 50:50 to 90:10, and 20 to 70 wt. % of a styrene-conjugated diolefin block copolymer, 20 to 150 parts by weight of a reinforcing filler, 3 to 30 parts by weight of sulfur, 0 to 50 parts by weight of a styrene resin and 0 to 100 parts by weight of an extending oil.

7 Claims, No Drawings

VULCANIZABLE RUBBER COMPOSITIONS AND VULCANIZED RUBBER

This application is a continuation of application Ser. No. 08/117,038, filed as PCT/JP93/00004 Jan. 8, 1992, now abandoned.

TECHNICAL FIELD

The present invention relates to a vulcanizable rubber composition containing an ethylene•α-olefin•non-conjugated diene copolymer, and a vulcanized rubber produced with the same. Such the vulcanizable rubber composition and vulcanized rubber can be used in a wide field including automobile parts, industrial parts, building materials and the like.

BACKGROUND ART

Presently, the ethylene•α-olefin-nonconjugated diene copolymer (hereinafter referred sometimes to as EPDM because propylene is commonly used as the α-olefin) is excellent in processability, weather resistance, ozone resistance, heat resistance and the like, so that it is widely used in fields such as automobile parts, industrial parts, building materials and the like. It is so far difficult, however, to make EPDM possess characteristics of further high strength and hardness without damaging its features as described above.

For example, for obtaining vulcanized rubbers having a hardness of 45 or more (Shore D hardness according to ASTM D 2240), the following methods are known, but any of them has problems.

For example, when the polymer component of the vulcanizable rubber composition is a diene rubber such as natural rubber, styrene-butadiene rubber, acrylonitrile-butadiene rubber or the like, vulcanized rubbers having the above hardness can be obtained by increasing the amount of a vulcanizing agent. In this case, however, there is a defect that the weather resistance and heat resistance of the resulting vulcanized rubber are inferior.

On the other hand, when the polymer component is a rubber having a small content of unsaturated hydrocarbon such as EPDM, vulcanized rubbers having the above hardness cannot be obtained by merely increasing the amount of the vulcanizing agent. Therefore, when EPDM is used as the polymer component, there is employed for example a method of using EPDM having a large content of ethylene as well as blending a large amount of a reinforcing agent (e.g. carbon black) and small amounts of a softening agent and a plasticizer, or a method of adding a thermosetting alkylphenolic resin to the EPDM described above.

In the former method, however, there are problems that the resulting vulcanizable rubber composition increases in Mooney viscosity so largely that its kneading with a Banbury mixer and its processing with a roll are difficult, and also that vulcanized rubbers obtained from it are short of hardness. On the other hand, the latter method is superior to the former one in processability at the time of production of the vulcanizable rubber composition. However, it has a defect as described below: The curing reaction of the alkylphenolic resin at the time of vulcanization produces water which in turn induces foaming of the rubber to make it difficult to obtain a satisfactory product, so that this method cannot be applied to normal-pressure continuous vulcanization, and therefore this method can only be applied to vulcanization under pressure such as autoclave vulcanization, press vulcanization and the like of poor productivity.

Further, vulcanized rubbers obtained by such the method have a problem that they are inferior in a speed at which they recover their original form after deformation, i.e. snappiness.

Also, there is a method of raising the hardness by blending EPDM with a polyolefin resin (e.g. polypropylene) or polystyrene resin. However, when the polyolefin resin is blended, there is a problem that the Mooney viscosity of the resulting vulcanizable rubber composition increases so remarkably that particularly processability on rolls and at the time of extrusion is inferior. Further, when the polystyrene resin is blended, there is a problem that the strength of the resulting vulcanized rubber is low.

DISCLOSURE OF THE INVENTION

The problem which the present invention intends to solve is to provide a vulcanized rubber possessing characteristics of further high strength and hardness without damaging the features of EPDM of being excellent in weather resistance, ozone resistance, heat resistance and the like, and a vulcanizable rubber composition giving such the vulcanized rubber.

The present inventors have made an extensive study to solve the above problem, and as a result have completed the present invention.

The present invention relates to a vulcanizable rubber composition comprising 100 parts by weight of a polymer component consisting of 30 to 80 wt. % of an ethylene•α-olefin•non-conjugated diene copolymer having a Mooney viscosity of 10 to 100 ($ML_{1+4}$ 100° C.) and an iodine value of 20 to 45 and containing ethylene and α-olefin in a weight ratio of 50:50 to 90:10, and 20 to 70 wt. % of a styrene•conjugated diolefin block copolymer, 20 to 150 parts by weight of a reinforcing filler, 3 to 30 parts by weight of sulfur, 0 to 50 parts by weight of a styrene resin and 0 to 100 parts by weight of an extending oil, and a vulcanized rubber excellent in weather resistance, ozone resistance and heat resistance and having high strength and high hardness produced with the above vulcanizable rubber composition by the continuous vulcanization method.

BEST MODE FOR CARRYING OUT THE INVENTION

The present invention will be illustrated in detail hereinafter.

First, the ethylene•α-olefin•non-conjugated diene copolymer used in the present invention will be illustrated.

The α-olefin, a constituent of the above copolymer, includes propylene, 1-butene, 4-methyl-1-pentene, 1-hexene, 1-octene and the like, among which propylene and 1-butene are preferred.

The weight ratio of ethylene to α-olefin in the copolymer is 50:50 to 90:10, preferably 65:35 to 90:10, more preferably 70:30 to 85:15. When the ethylene content is smaller than 50% of the total weight of ethylene and α-olefin, strength after vulcanization becomes low. When the ethylene content is larger than 90%, processing under rubber molding conditions commonly used is difficult. The both contents are not therefore preferred.

The non-conjugated diene, a constituent of the copolymer, includes 1,4-pentadiene, 1,4-hexadiene, divinylbenzene, dicyclopentadiene, methylenenorbornene, ethylidenenorbornene, vinylnorbornene and the like, among which dicyclopentadiene and ethylidenenorbornene are preferred.

The content of the non-conjugated diene in the copolymer is an amount giving an iodine value of 20 to 45, preferably 20 to 35. When the iodine value is less than 20, strength and elongation after vulcanization are undesirably low. In contrast, when the iodine value exceeds 45, there occur problems that elongation after vulcanization lowers and also the cost becomes high.

The Mooney viscosity ($ML_{1+4}$ 100° C.) of the copolymer is 10 to 100, preferably 20 to 50. When the Mooney viscosity is less than 10, there is a problem that performance after vulcanization, for example, tensile strength lowers. When the Mooney viscosity exceeds 100, the viscosity of the vulcanizable rubber composition becomes too high, so that processability at the time of kneading on a Banbury mixer, etc. becomes undesirably poor.

Next, the styrene-conjugated diolefin block copolymer used in the present invention will be illustrated.

The conjugated diolefin includes 1,3-butadiene, isoprene, 2,3-dimethyl-1,3-butadiene, 1,3-pentadiene and the like, and particularly 1,3-butadiene is preferred.

The structure of the above block copolymer is a linear block copolymer represented by the formula,

$(A-B)_n$, $A-(B-A)_n$ or $B-(A-B)_n$ wherein A is a polymer block consisting mainly of styrene, B is a polymer block consisting mainly of a conjugated diolefin, but it is not always necessary for the boundary between the A block and B block to be clearly distinguished from each other, and n is an integer of 1 or more, or a radial block copolymer represented by the formula,

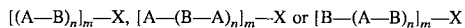

$[(A-B)_n]_m-X$, $[A-(B-A)_n]_m-X$ or $[B-(A-B)_n]_m-X$ wherein A and B are as defined above, X represents the residue of a branching agent, n is an integer of 1 or more, and m is an integer of 3 or more.

The weight ratio of styrene to conjugated diolefin in the block copolymer is preferably 30:70 to 90:10, more preferably 40:60 to 90:10, further more preferably 60:40 to 90:10 in the light of raising the hardness of the vulcanized rubber.

In the binary polymer component used in the present invention comprising the ethylene•α-olefin•non-conjugated diene copolymer and the styrene-conjugated diolefin block copolymer, the proportion of the ethylene•α-olefin•non-conjugated diene copolymer blended is 30 to 80 wt. %. When this proportion is smaller than 30 wt. %, the elongation of the vulcanized ruber undesirably lowers. When this proportion is larger than 80 wt. %, there occurs a problem that the hardness of the vulcanized rubber lowers to fail to obtain the desired hardness.

The vulcanizable rubber composition of the present invention contains, together with the above polymer component, a reinforcing filler, sulfur and if necessary a styrene resin and an extending oil.

Such the reinforcing filler includes carbon black, silica and the like, among which carbon black is preferred.

The amount of the reinforcing filler blended is 20 to 150 parts by weight, preferably 30 to 120 parts by weight based on 100 parts by weight of the polymer component. If this amount is in the above range, the processability is good, and there is obtained the vulcanizable rubber composition giving the vulcanized rubber having high strength and high strength.

The amount of sulfur blended in the present invention is 3 to 30 parts by weight, preferably 4 to 15 parts by weight based on 100 parts by weight of the polymer component. When this amount is smaller than 3 parts by weight, the strength and hardness of the vulcanized rubber undesirably lower. While when this amount exceeds 30 parts by weight, there come out undesirable results such as lowering in elongation after vulcanization, blooming of sulfur present in excess and no remarkable effect to improve the hardness of the vulcanized rubber.

In the present invention, the styrene resin is not essential, but may be blended in order to improve the hardness of the vulcanized rubber. The amount of the styrene resin blended is 0 to 50 parts by weight, preferably 5 to 50 parts by weight, particularly preferably 5 to 30 parts by weight based on 100 parts by weight of the polymer component consisting of the ethyelen•α-olefin•non-conjugated diene copolymer and styrene conjugated diolefin block copolymer. When the amount of the styrene resin blended exceeds 50 parts by weight, elongation and tensile strength after vulcanization undesirably lower.

This styrene resin includes polystyrene which is a homopolymer of styrene, rubber-modified polystyrene (HIPS), styrene acrylonitrile copolymer and the like, among which polystyrene, a homopolymer of styrene, is preferred.

Specific examples of the extending oil contained if necessary in the vulcanizable rubber composition of the present invention include the so-called process oils such as aromatic oil, naphthene oil, paraffin oil, etc. and vegetable oils such as coconut oil, etc. Among these oils, the process oils are preferred, and particularly the paraffin oil or naphthene oil is preferred.

The amount of the extending oil blended is 0 to 100 parts by weight based on 100 parts by weight of the polymer component. This amount is optionally selected from this range according to the desired processability of the vulcanizable rubber composition and the desired hardness of the vulcanized rubber. By selecting the amount of the extending oil from this range, there can be obtained the vulcanizable rubber composition having a good processability and giving the vulcanized rubber having high strength and high hardness.

In order to improve the processability, a polyethylene resin or a polypropylene resin may be incorporated if necessary into the vulcanizable rubber composition of the present invention.

To the vulcanizable rubber composition of the present invention may properly be added compounding agents commonly used for rubber. Such the compounding agents include fillers, softening agents, vulcanization accelerators, co-vulcanizing agents, processing aids, antifoaming agents, zinc white, stearic acid, antioxidants and the like.

For producing the vulcanizable rubber composition of the present invention, the so far known processing method can be used. That is, the foregoing compounding agents are added to the polymer component, and the resulting mixture is thoroughly mixed with an open roll mill, Banbury mixer, kneader or the like to prepare the vulcanizable rubber composition of the present invention.

For producing the vulcanized rubber of the present invention from the above vulcanizable rubber composition, this rubber composition is formed, if necessary, into a desired shape by extrusion molding, calender molding or the like and then vulcanized. The vulcanization method includes various ones such as press vulcanization, autoclave vulcanization, hot air vulcanization, UHF vulcanization, LCM vulcanization, PCM vulcanization and the like. Alternatively, a continuous vulcanization method in which the above various methods have properly been combined can be used. Particularly, the continuous vulcanization method which can produce long-dimensional products with good efficiency is preferred as a method for producing the vulcanized rubber of the present invention.

On vulcanizing the vulcanizable rubber composition of the present invention, there can be obtained a vulcanized rubber having high strength and high hardness without damaging the weather resistance, ozone resistance and heat resistance which are inherent to EPDM.

The present invention will be illustrated specifically with reference to the following examples, but it is not to be interpreted as being limited thereto.

EXAMPLES 1 TO 18

The compounding agents from EPDM to Hitanol 1501 shown in Table 1 were kneaded on a BR-type Banbury mixer. Thereafter, other compounding agents in Table 1 were added to the mixture and kneaded on a 10-inch open roll to produce a vulcanizable rubber composition.

The vulcanizable rubber composition thus obtained was vulcanized at 160° C. for 20 minutes using a press vulcanization apparatus.

The kinds and properties of EPDM and the styrene-butadiene block copolymer (SB) are shown in Table 2 and Table 3, respectively.

The combination of the polymer component with polystyrene, the amount of sulfur blended and the physical properties of the resulting vulcanized rubber are shown in Table 4, Table 5 and Table 6. The physical properties of the vulcanized rubbers were measured according to ASTM D 2240.

Comparative Examples 1 to 4

According to the combination of the polymer component with polystyrene and the amount of sulfur blended shown in Table 7, the compounding agents were kneaded and then vulcanized by the same method as in the Examples. The physical properties of the resulting vulcanized rubbers are shown in Table 7.

All of the vulcanized rubbers in Examples 1 to 18 of the present invention have high strength and high hardness. On the other hand, the vulcanized rubber obtained in Comparative Example 1, in which the amount of EPDM constituting the binary polymer component exceeded 80 wt. % of the component, has a low hardness as compared with the vulcanized rubbers in Examples 8 to 10. The vulcanized rubber obtained in Comparative Example 2, in which the polymer component contained no styrene conjugated diolefin block copolymer, is excellent in hardness but inferior in tensile strength. The vulcanized rubbers obtained in Comparative Examples 3 and 4, in which the amount of sulfur blended was small, are inferior in hardness or tensile strength.

INDUSTRIAL APPLICABILITY

The vulcanizable rubber composition of the present invention is applied not only to the production of vulcanized rubbers by itself, but also to the production of rubber articles in a composite with other rubber compositions and resin compositions for the purpose of forming a part of the rubber articles, for example, the surface layer, lip part, core part and the like of the articles.

The vulcanized rubber of the present invention, because of its excellent weather resistance, ozone resistance and heat resistance as well as its high strength and high hardness, can be utilized in a wide field including automobile parts, industrial parts, building materials and the like. Such the automobile parts include packings, hoses, wiper blade rubber, glassrunning rubber, weather strip, the solid rubber part of composites of soft solid rubber with hard solid rubber, the solid rubber part of composites of sponge rubber with solid rubber applied to door seal and trunk seal, mudguard and the like. The industrial parts include rubber roll, sealing material, packing and the like. The building materials include setting block, rubber tile, gasket and the like.

TABLE 1

| Compounding agent | Amount blended (part by weight) |
| --- | --- |
| EPDM in Table 2 | Varying amount |
| SB in Table 3 *1 | Varying amount |
| Polystyrene *2 | Varying amount |
| Zinc white No. 3 | 5 |
| Stearic acid | 1 |
| FEF Black | 60 |
| Naphthene oil | 5 |
| Hitanol 1501 *3 | 5 |
| Calcium oxide | 5 |
| Soxinol CZ *4 | 2.5 |
| Soxinol TT *5 | 0.5 |
| Sulfur | Varying amount |

*1 Styrene-butadiene block copolymer
*2 Esbrite 2V produced by Sumitomo Chemical Co., Ltd.
*3 Phenol-formaldehyde resin produced by Hitachi Kasei Kogyo Co., Ltd.
*4 N-cyclohexyl-2-benzothiazyl sulfenamide
*5 tetramethylthiuram disulfide

TABLE 2

| Kind of EPDM | $ML_{1+4}$ 100° C. | Ethylene/propylene (weight ratio) | Iodine value |
| --- | --- | --- | --- |
| EPDM-1 | 32 | 79/21 | 30 |
| EPDM-2 | 45 | 52/48 | 24 |
| EPDM-3 | 75 | 55/45 | 24 |
| EPDM-4 | 85 | 80/20 | 35 |

TABLE 3

| Kind of SB | MFR 200° C., 5 kg (g/10 min) | Styrene content (wt %) |
| --- | --- | --- |
| SB-1 | <1 | 21 |
| SB-2 | <1 | 30 |
| SB-3 | 50 | 40 |
| SB-4 | 7.5 | 75 |

TABLE 4

| | Example | | | | | | |
| --- | --- | --- | --- | --- | --- | --- | --- |
| | 1 | 2 | 3 | 4 | 5 | 6 | 7 |
| EPDM-1 | — | — | — | — | 60 | — | — |
| EPDM-2 | — | — | — | — | — | 60 | — |
| EPDM-3 | 60 | 60 | 60 | 60 | — | — | — |
| EPDM-4 | — | — | — | — | — | — | 60 |
| SB-1 | 40 | — | — | — | — | — | — |
| SB-2 | — | 40 | — | — | — | — | — |
| SB-3 | — | — | 40 | — | — | — | — |
| SB-4 | — | — | — | 40 | 40 | 40 | 40 |
| Polystyrene | — | — | — | — | — | — | — |
| Sulfur | 4.5 | 4.5 | 4.5 | 4.5 | 4.5 | 4.5 | 4.5 |
| Physical | | | | | | | |

TABLE 4-continued

|  | Example | | | | | | |
| --- | --- | --- | --- | --- | --- | --- | --- |
|  | 1 | 2 | 3 | 4 | 5 | 6 | 7 |
| properties of vulcanized rubber | | | | | | | |
| Tensile strength (kgf/cm$^2$) | 132 | 137 | 149 | 164 | 183 | 147 | 198 |
| Elongation (%) | 110 | 100 | 120 | 185 | 125 | 145 | 120 |
| Hardness (Shore D) | 45 | 48 | 51 | 58 | 65 | 57 | 61 |

TABLE 5

|  | Example | | | | |
| --- | --- | --- | --- | --- | --- |
|  | 8 | 9 | 10 | 11 | 12 |
| EPDM-1 | — | — | — | 13 | — |
| EPDM-2 | — | — | — | — | — |
| EPDM-3 | 80 | 60 | 40 | 60 | 60 |
| EPDM-4 | — | — | — | — | — |
| SB-1 | — | — | — | — | — |
| SB-2 | — | — | — | — | — |
| SB-3 | — | — | — | — | — |
| SB-4 | 20 | 40 | 60 | 20 | 30 |
| Poylstyrene | — | — | — | 20 | 10 |
| Sulfur | 4.5 | 4.5 | 4.5 | 4.5 | 4.5 |
| Physical properties of vulcanized rubber | | | | | |
| Tensile strentgh (kgf/cm$^2$) | 165 | 164 | 228 | 141 | 145 |
| Elongation (%) | 210 | 185 | 80 | 130 | 120 |
| Hardness (Shore D) | 48 | 58 | 72 | 58 | 57 |

TABLE 6

|  | Example | | | | | |
| --- | --- | --- | --- | --- | --- | --- |
|  | 13 | 14 | 15 | 16 | 17 | 18 |
| EPDM-1 | — | — | — | — | — | — |
| EPDM-2 | — | — | — | — | — | — |
| EPDM-3 | 60 | 60 | 60 | 60 | 60 | 60 |
| EPDM-4 | — | — | — | — | — | — |
| SB-1 | — | — | — | — | — | — |
| SB-2 | — | — | — | — | — | — |
| SB-3 | — | — | — | 20 | 20 | 20 |
| SB-4 | 40 | 40 | 40 | — | — | — |
| Polystyrene | — | — | — | 20 | 20 | 20 |
| Sulfur | 3.0 | 6.0 | 9.0 | 4.5 | 6.0 | 9.0 |
| Physical properties of vulcanized ruubber | | | | | | |
| Tensile strength (kgf/cm$^2$) | 165 | 169 | 170 | 133 | 135 | 140 |
| Elongation (%) | 120 | 100 | 90 | 180 | 160 | 130 |
| Harness (Shore D) | 60 | 65 | 68 | 52 | 56 | 61 |

TABLE 7

|  | Comparative Example | | | |
| --- | --- | --- | --- | --- |
|  | 1 | 2 | 3 | 4 |
| EPDM-1 | — | — | — | — |
| EPDM-2 | — | — | — | — |
| EPDM-3 | 90 | 60 | 60 | 60 |
| EPDM-4 | — | — | — | — |
| SB-1 | — | — | — | — |
| SB-2 | — | — | — | — |
| SB-3 | — | — | 40 | 20 |
| SB-4 | 10 | — | — | — |
| Polystyrene | — | 40 | — | 20 |
| Sulfur | 4.5 | 4.5 | 1.5 | 1.5 |
| Physical properties of vulcanized rubber | | | | |
| Tensile strength (kgf/cm$^2$) | 172 | 95 | 131 | 99 |
| Elongation (%) | 230 | 80 | 160 | 160 |

We claim:

1. A vulcanized rubber obtained by vulcanizing a vulcanizable rubber composition comprising 100 parts by weight of a polymer component consisting of 30 to 80 wt. % of an ethylene·α-olefin·non-conjugated diene copolymer having a Mooney viscosity of 10 to 100 (ML$_{1+4}$ 100° C.) and an iodine value of 20 to 45 and containing ethylene and α-olefin in a weight ratio of 50:50 to 90:10, and 20 to 70 wt. % of a non-hydrogenated styrene·conjugated diolefin block copolymer, 20 to 150 parts by weight of a reinforcing filler, 3 to 30 parts by weight of sulfur, 0 to 50 parts by weight of a styrene resin and 0 to 100 parts by weight of an extending oil.

2. The vulcanized rubber obtained by vulcanizing a vulcanizable rubber composition according to claim 1, wherein the α-olefin is propylene or 1-butene.

3. The vulcanized rubber obtained by vulcanizing a vulcanizable rubber composition according to claim 1, wherein the non-conjugated diene is dicyclopentadiene or ethylidenenorbornene.

4. The vulcanized rubber obtained by vulcanizing a vulcanizable rubber composition according to claim 1, wherein the weight ratio of styrene to the conjugated diolefin is 30:70 to 90:10.

5. The vulcanized rubber composition according to claim 4, wherein the conjugated diolefin is 1,3-butadiene.

6. The vulcanized rubber obtained by vulcanizing a vulcanizable rubber composition according to claim 1, wherein the styrene resin is polystyrene.

7. The vulcanized rubber obtained by vulcanizing a vulcanizable rubber composition according to claim 1, wherein the amount of the styrene resin blended is 5 to 30 parts by weight per 100 parts by weight of the polymer component.

* * * * *